UNITED STATES PATENT OFFICE.

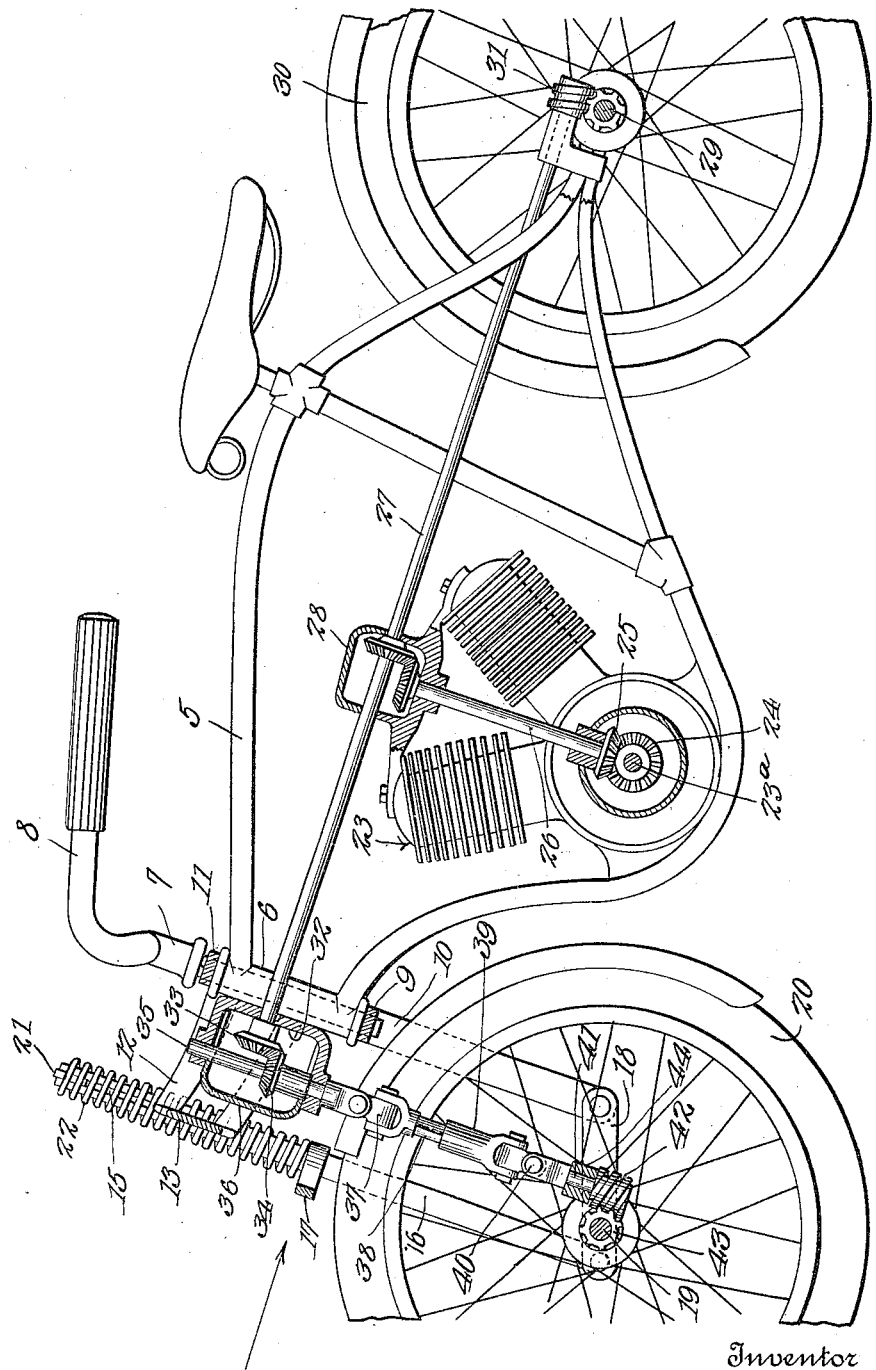

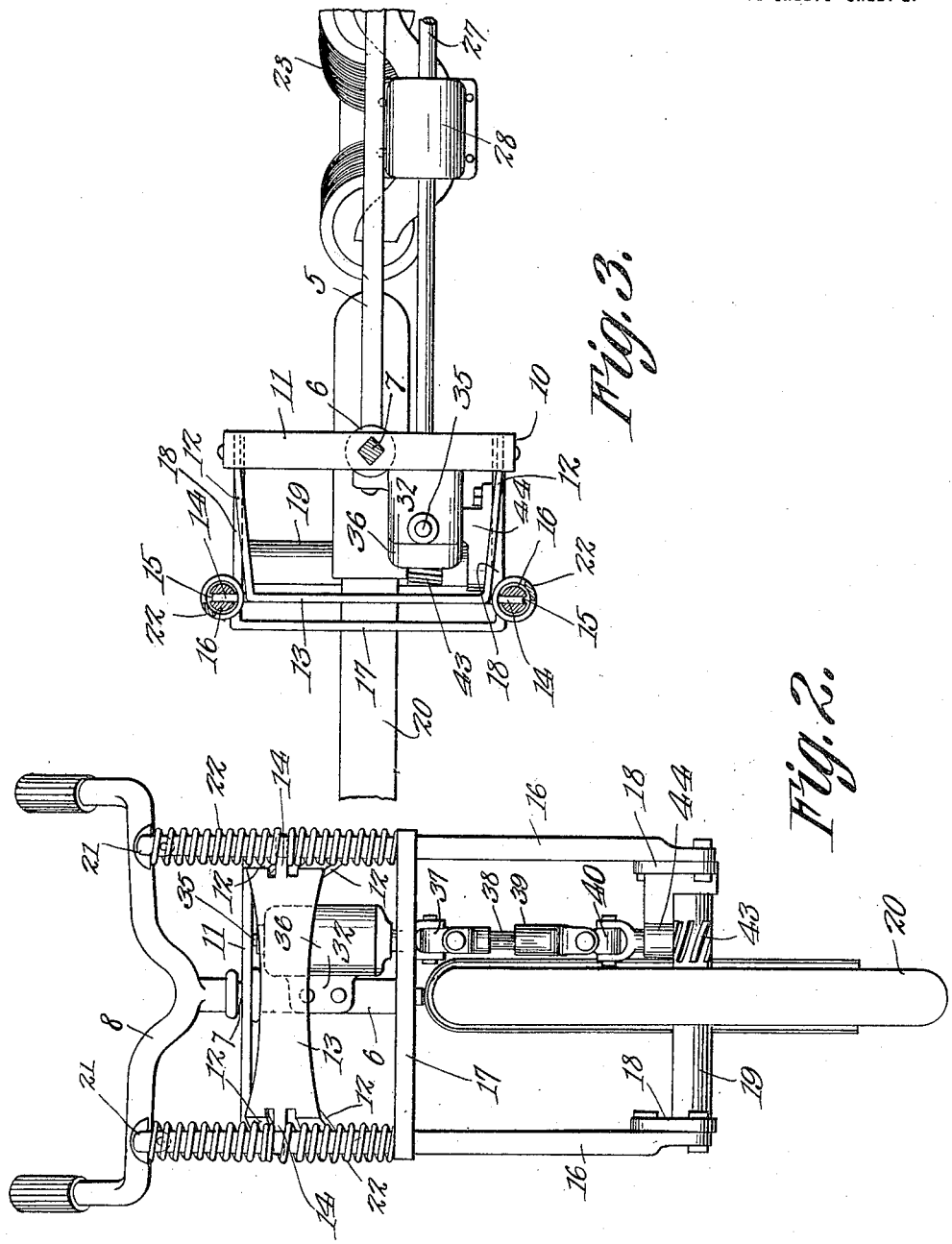

ARTHUR H. W. YORDI, OF CLINTONVILLE, WISCONSIN.

MOTOR-CYCLE.

1,139,622.   Specification of Letters Patent.   Patented May 18, 1915.

Application filed May 2, 1914. Serial No. 835,891.

*To all whom it may concern:*

Be it known that I, ARTHUR H. W. YORDI, a citizen of the United States, residing at Clintonville, in the county of Waupaca and State of Wisconsin, have invented certain new and useful Improvements in Motor-Cycles, of which the following is a specification.

This invention relates to motor-cycles and similar road vehicles, and its object is to provide a novel and improved driving means whereby a front and a rear drive is had.

A further object of the invention is to provide a novel and improved spring support for the front or steering wheel.

These objects are attained by means of a combination and arrangement of parts to be hereinafter described and claimed, reference being had to the accompanying drawings, in which—

Figure 1 is a side elevation, partly in section, of a motor-cycle provided with my improved driving means; Fig. 2 is a front elevation thereof, looking in the direction of the arrow in Fig. 1, and Fig. 3 is a plan view of the front end of the machine.

Referring specifically to the drawings, 5 denotes the frame of the machine, the same having at the front the usual steering head 6 in which is swiveled the stem 7 of a fork to the upper end of which stem is attached a handle-bar 8. To the lower end of the stem is rigidly fastened a crown plate 9 which extends in opposite directions from the same and has rigidly fastened to its outer ends the fork branches 10, the same extending downward from the crown plate and also having upward extensions which are connected at the top by a cross bar 11 having intermediate its ends an aperture through which the upper end of the stem 7 loosely passes. The upper ends of the fork branches 10 carry forwardly extending bracket arms 12 which latter support, at their outer ends a cross-head 13 having outstanding fingers 14 at its ends which seat loosely in longitudinal slots 15 in the upper ends of rods 16 located in front of the fork branches and extending parallel thereto. The rods 16 are connected intermediate their ends by a cross bar 17, and their lower ends are connected to the corresponding ends of the fork branches by pivoted links 18. The axle 19 of the front wheel 20 is carried by these links, between the fork branches 10 and the rods 16. Around the rods 16, between the ends of the cross bar 17 and abutments 21 pivoted in the upper ends of the slots 15, are coiled springs 22 which engage the fingers 14. This structure provides a spring support for the frame 5 of the machine.

The frame 5 of the machine supports the engine 23 in any suitable manner. The shaft 23ª of the engine has a bevel gear 24 which is in mesh with a corresponding gear 25 on an upwardly extending shaft 26, and the latter shaft is geared to a shaft 27 extending in the direction of the length of the machine. Any suitable gearing between the shafts 26 and 27 may be provided, the same being inclosed in a case 28 supported in any suitable manner. The rear end of the shaft 27 is geared to the axle 29 of the hind wheel 30, by a worm gearing 31. The shaft 27 also has a driving connection with the axle 19 of the front wheel 20 in order that a front drive, in addition to the rear drive, may be had. This front driving connection is constructed and arranged as follows: The forward end of the shaft 27 is supported to one side of the head 6 by a bearing bracket 32 and on said end of the shaft is a bevel gear 33 which is in mesh with a bevel gear 34 on the upper end of a shaft 35, the aforesaid bracket also having bearings for the shaft 35, and carrying a housing or case 36 inclosing the gears 33 and 34. The lower end of the shaft 35 is connected by a universal joint 37 to a short shaft 38, which latter is angular in cross section and telescopically or slidably mounted in a hollow shaft 39. A universal joint 40 connects the shaft 39 to a shaft 41 carrying a worm wheel 42 which is in mesh with a worm 43 on the axle 19.

It will be evident from the foregoing that a flexible driving connection is provided, which allows the front wheel to be shifted sidewise to steer the machine and the sliding connection between the shafts 38 and 39 allows relative vertical movement of the axle 19 and the frame 5 of the machine. The shaft 41 is supported in a bearing 44 carried by one of the links 18.

The invention is shown applied to a motor-cycle having one front and one hind wheel, but it may, with equal facility, be applied to three-wheeled motor-cycles, or to other road vehicles in which a front and a rear drive is desired.

I claim:

The combination with the frame and the axle and steering wheel of a motor-cycle; of a drive shaft supported by and extending in the direction of the length of the frame, a bevel gear on the forward end of said shaft, a driven shaft, a bevel gear on said driven shaft meshing with the first-mentioned bevel gear, a second driven shaft, a flexible connection between said driven shafts, a third driven shaft, a sliding driving connection between the second and third-mentioned driven shafts, a shaft geared to the axle of the steering wheel, and a flexible connection between the last-mentioned shaft and the third-mentioned driving shaft.

In testimony whereof I affix my signature in presence of two witnesses.

ARTHUR H. W. YORDI.

Witnesses:
R. G. GIBSON,
FRED YORDI.

Copies of this patent may be obtained for five cents each, by addressing the "Commissioner of Patents, Washington, D. C."